(12) United States Patent
Murata (10) Patent No.: US 10,846,360 B2
(45) Date of Patent: Nov. 24, 2020

(54) DISPLAY CONTROL APPARATUS AND DISPLAY CONTROL METHOD

(71) Applicant: KYOCERA Document Solutions Inc., Osaka (JP)

(72) Inventor: Shuji Murata, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 253 days.

(21) Appl. No.: 15/873,951

(22) Filed: Jan. 18, 2018

(65) Prior Publication Data

US 2018/0203868 A1    Jul. 19, 2018

(30) Foreign Application Priority Data

Jan. 19, 2017  (JP) ................. 2017-007321

(51) Int. Cl.
| | | |
|---|---|---|
| *G06F 3/0481* | (2013.01) | |
| *G06F 3/0482* | (2013.01) | |
| *G06F 16/958* | (2019.01) | |
| *G06F 3/01* | (2006.01) | |
| *G06F 3/041* | (2006.01) | |
| *H04L 29/08* | (2006.01) | |
| *G06F 16/951* | (2019.01) | |
| *G06F 16/955* | (2019.01) | |
| *G06F 3/0488* | (2013.01) | |

(52) U.S. Cl.
CPC ............ *G06F 16/958* (2019.01); *G06F 3/011* (2013.01); *G06F 3/0412* (2013.01); *G06F 3/0481* (2013.01); *G06F 16/951* (2019.01); *G06F 16/9566* (2019.01); *H04L 67/02* (2013.01); *G06F 3/0488* (2013.01)

(58) Field of Classification Search
CPC ............................. G06F 16/9577; G06F 16/40
See application file for complete search history.

(56) References Cited

U.S. PATENT DOCUMENTS

| | | | | |
|---|---|---|---|---|
| 2007/0101288 A1* | 5/2007 | Forstall | .................. | G06F 9/451 715/781 |
| 2008/0244408 A1* | 10/2008 | King | ...................... | G06Q 30/02 |
| 2009/0083656 A1* | 3/2009 | Dukhon | .............. | G06F 3/04842 715/781 |
| 2012/0062940 A1* | 3/2012 | Masutani | ................ | G06T 11/60 358/1.15 |

(Continued)

FOREIGN PATENT DOCUMENTS

JP          2004-151985 A        5/2004

*Primary Examiner* — Rayeez R Chowdhury
(74) *Attorney, Agent, or Firm* — Studebaker & Brackett PC (57) ABSTRACT

A smartphone displays a web page. The web page includes a first object exhibiting an image and a second object exhibiting a link. The smartphone includes a display, a first display section, and a second display section. The first display section displays an alternative web page which is identical to the web page aside from including a third object instead of the first object, before information indicating the image is downloaded. The third object indicates that the image is to be displayed. The second display section displays the web page after the information indicating the image is downloaded. The second display section displays the first and second objects such that a display location of the second object on the web page coincides with a display location of the second object on the alternative web page.

9 Claims, 10 Drawing Sheets

(56) References Cited

U.S. PATENT DOCUMENTS

2012/0072835 A1\* 3/2012 Gross ................... G06Q 10/10
715/243
2014/0359405 A1\* 12/2014 Hou ................... G06F 16/9577
715/202

\* cited by examiner

DISPLAY CONTROL APPARATUS AND DISPLAY CONTROL METHOD

INCORPORATION BY REFERENCE

The present application claims priority under 35 U.S.C. § 119 to Japanese Patent Application No. 2017-007321, filed on Jan. 19, 2017. The contents of this application are incorporated herein by reference in their entirety.

BACKGROUND

The present disclosure relates to a display control apparatus that includes a display, and a display control method.

When downloading information that indicates a web page to be displayed as a screen on a certain web terminal apparatus, the web terminal apparatus downloads and displays representative content having a small data amount on the web page, and then begins to download actual content having a large data amount.

SUMMARY

A first display control apparatus according to an aspect of the present disclosure is a display control apparatus for displaying a web page. The web page includes a first object and a second object. The first object exhibits an image, and the second object exhibits a link on the web page. The display control apparatus includes a display, an acquiring section, a first display section, and a second display section. The acquiring section downloads information indicating the web page from a server. The first display section displays an alternative web page on the display before information indicating the image is downloaded. The alternative web page is identical to the web page aside from including a third object instead of the first object. The third object indicates that the image is to be displayed. The second display section displays the web page on the display after the information indicating the image is downloaded. The second display section displays the first object and the second object such that a display location of the second object on the web page coincides with a display location of the second object on the alternative web page.

A second display control apparatus according to an aspect of the present disclosure is a display control apparatus for displaying a web page. The web page includes a first object and a second object. The first object exhibits an image, and the second object exhibits a link on the web page. The display control apparatus includes a display, an acquiring section, a first display section, a second display section, and a restricting section. The acquiring section downloads information indicating the web page from a server. The first display section displays an alternative web page on the display before information indicating the image is downloaded. The alternative web page is identical to the web page aside from including a third object instead of the first object, the third object indicating that the image is to be displayed. The second display section displays the web page on the display after the information indicating the image is downloaded. The first object is configured to display a linked web page from a link of the first object when a predetermined operation is executed on the first object. The restricting section restricts the linked web page from being displayed until a first condition is fulfilled, when the predetermined operation is executed on the first object.

A display control method according to an aspect of the present disclosure is implemented by a display control apparatus for displaying a web page on a display. The web page includes a first object and a second object. The first object exhibits an image, and the second object exhibits a link on the web page. The display control method includes acquiring, primarily displaying, and secondarily displaying. In the acquiring, information indicating the web page is downloaded from a server. In the primarily displaying, an alternative web page is displayed on the display before information indicating the image is downloaded. The alternative web page is identical to the web page aside from including a third object instead of the first object. The third object indicates that the image is to be displayed. In the secondarily displaying, the web page is displayed on the display after the information indicating the image is downloaded. In the secondarily displaying, the first object and the second object are displayed such that a display location of the second object on the web page coincides with a display location of the second object on the alternative web page.

BRIEF DESCRIPTION OF THE DRAWINGS

FIGS. 4A and 4B are screen diagrams illustrating an example of a process of the controller according to the first embodiment.

FIGS. 6A and 6B are screen diagrams illustrating an example of a process of the controller according to the second embodiment.

FIGS. 9A and 9B are screen diagrams illustrating an example of a process of the controller according to the third embodiment.

DETAILED DESCRIPTION

Embodiments of the present disclosure will be described as follows with reference to the drawings (FIGS. 1 to 10). Note that elements in the drawings that are the same or equivalent are labelled using the same reference signs and description thereof is not repeated.

Common Configuration of First Through Third Embodiments

Figure 1:
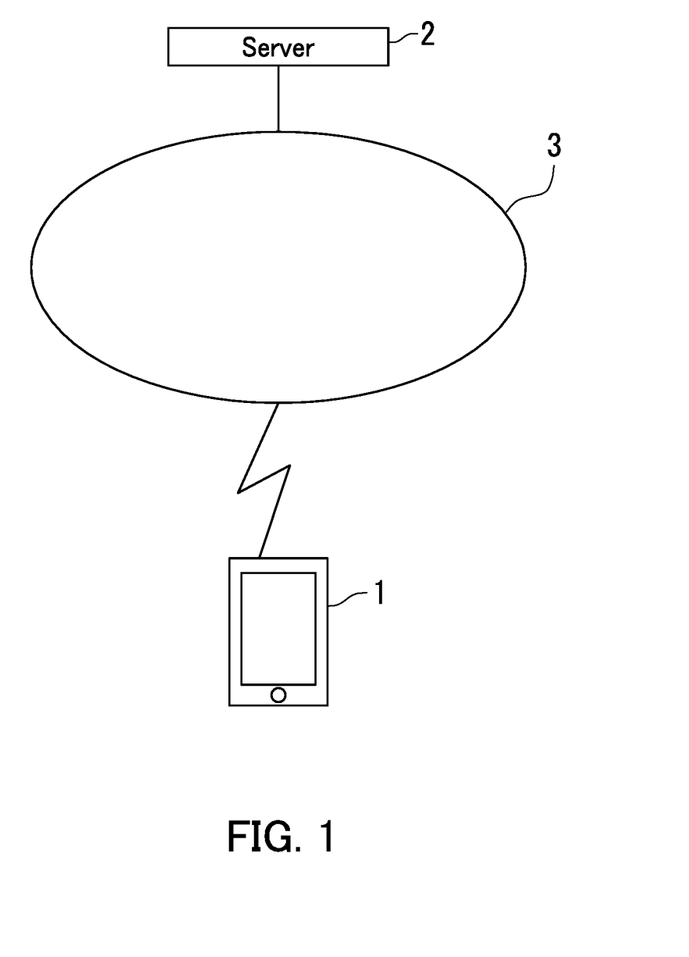
FIG. 1 is a diagram illustrating a connected state of a smartphone according to embodiments of the present disclosure.
Figure 2:
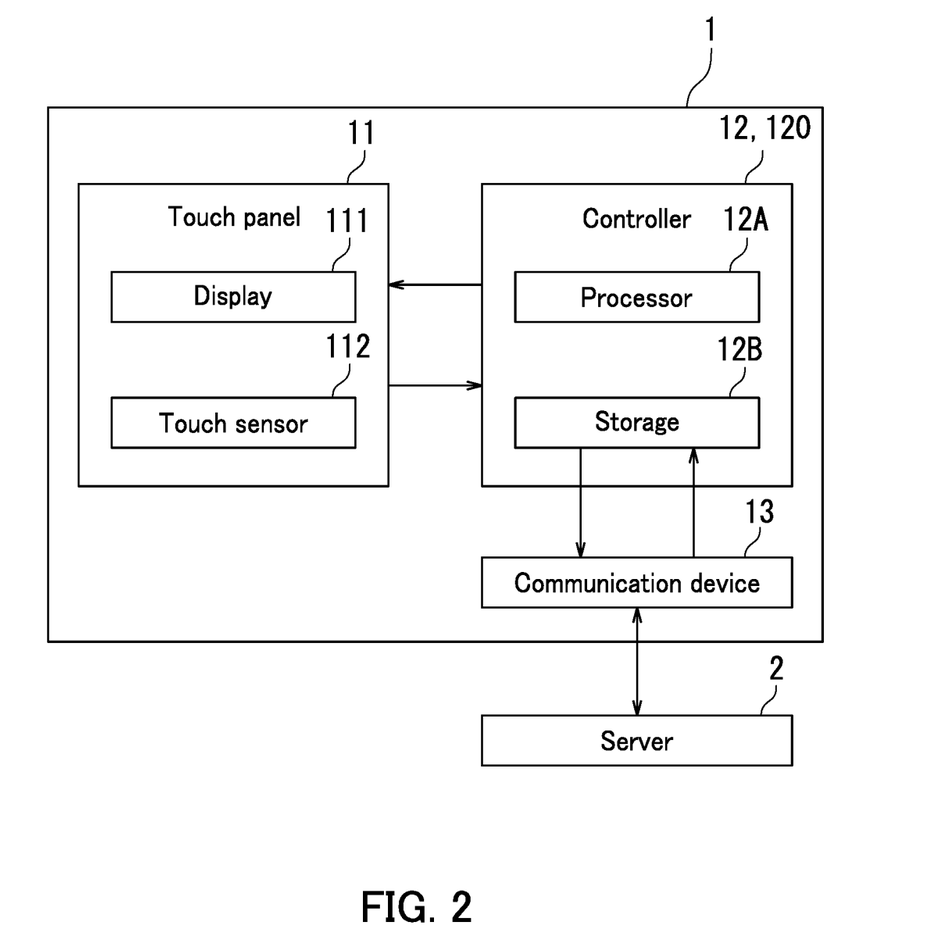
FIG. 2 is a diagram illustrating a configuration of the smartphone according to the embodiments of the present disclosure.

First, a common configuration of first through third embodiments will be described with reference to FIGS. 1 and 2. FIG. 1 is a diagram illustrating a connected state of a smartphone 1 according to the embodiments of the present disclosure. As illustrated in FIG. 1, the smartphone 1 is communicatively connected to a server 2 through a network 3. The network 3 is the Internet, for example.

The smartphone 1 downloads and displays web page information from the server 2 through the network 3. The web page information is equivalent to "information indicating the web page". The smartphone 1 is an example of a "display control apparatus".

The server 2 sends the web page information through the network 3 to the smartphone 1, according to a request from the smartphone 1.

Next, a configuration of the smartphone 1 according to the embodiments of the present disclosure will be described with reference to FIGS. 1 and 2. FIG. 2 is a diagram illustrating the configuration of the smartphone 1. As illustrated in FIG. 2, the smartphone 1 includes a touch panel 11, a controller 12, and a communication device 13.

The touch panel 11 displays images and receives operations from a user. The controller 12 controls operation of the touch panel 11. The communication device 13 receives the web page information from the server 2 through the network 3.

The touch panel 11 includes a display 111 and a touch sensor 112. The display 111 displays images. The touch sensor 112 detects a touch location of an object on the touch panel 11. The touch sensor 112 is located over a display surface of the display 111, for example.

The controller 12 includes a processor 12A and storage 12B. The processor 12A includes a central processing unit (CPU), for example. The storage 12B includes memory such as semiconductor memory, and may include a hard disk drive (HDD). The storage 12B stores a control program.

The communication device 13 communicatively connects to the server 2 through wireless communication such as IEEE 802.11 (Wi-Fi). Also, the communication device 13 communicatively connects to the server 2 through a base station.

Common Configuration of First and Second Embodiments

Figure 3:
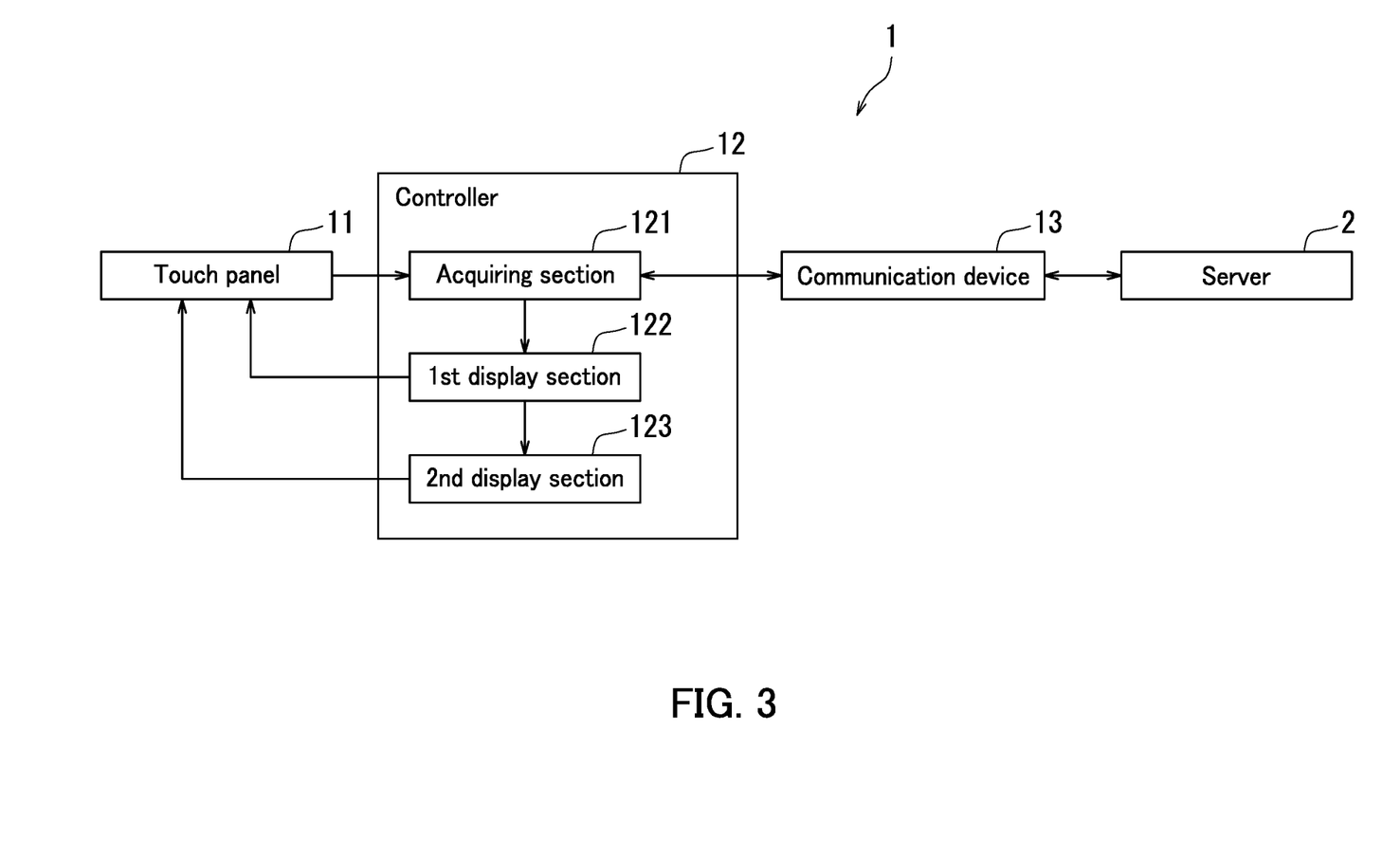
FIG. 3 is a diagram illustrating a configuration of a controller according to first and second embodiments of the present disclosure.
Figure 4A:
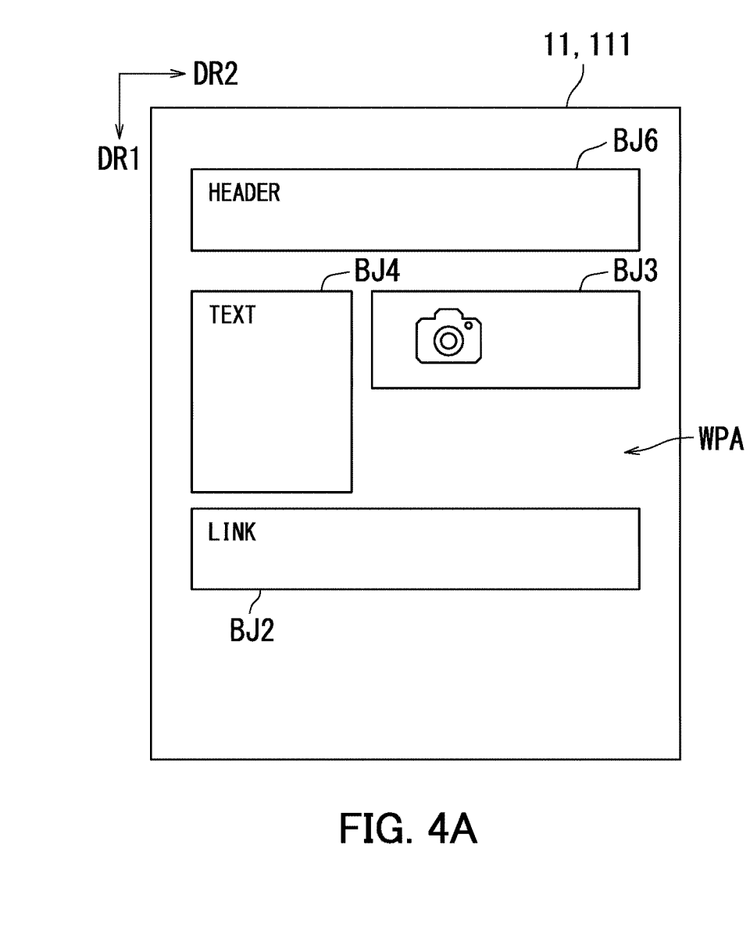
FIG. 4A illustrates a screen from before image information is downloaded.
Figure 4B:
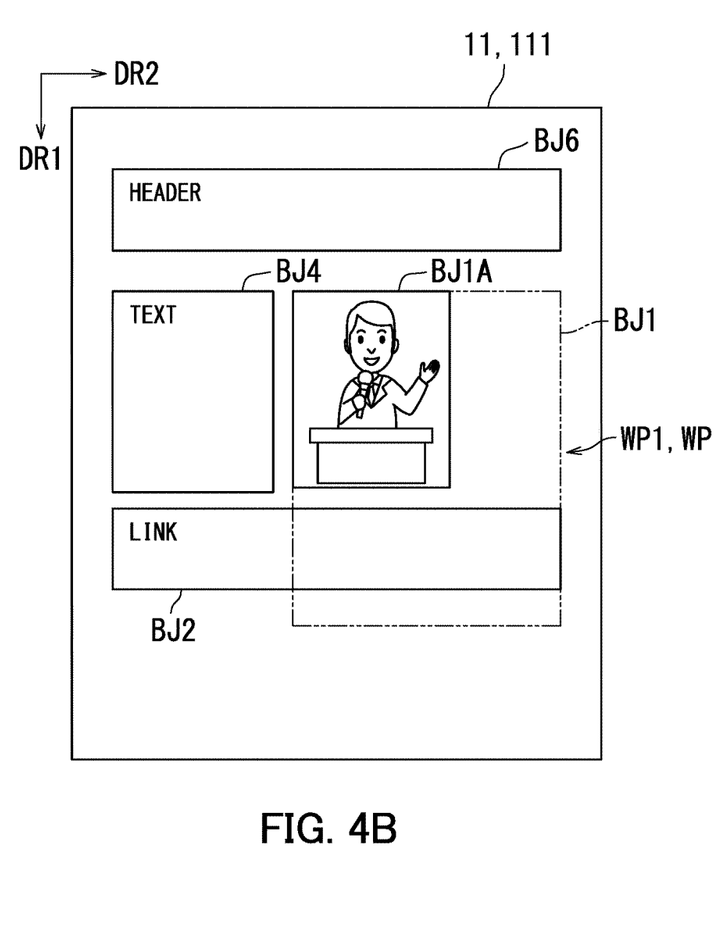
FIG. 4B illustrates a screen from after the image information is downloaded.

Next, a configuration of the controller 12 according to the first and second embodiments of the present disclosure will be described with reference to FIGS. 1 to 4B. FIG. 3 is a diagram illustrating the configuration of the controller 12. FIGS. 4A and 4B are screen diagrams illustrating an example of a process of the controller 12 according to the first embodiment. FIG. 4A illustrates a screen from before image information is downloaded. FIG. 4B illustrates a screen from after the image information is downloaded.

As illustrated in FIG. 3, the controller 12 includes an acquiring section 121, a first display section 122, and a second display section 123. Specifically, the processor 12A functions as the acquiring section 121, the first display section 122, and the second display section 123 by executing a control program. In the following, the configuration of the controller 12 illustrated in FIG. 3 will be described with reference to FIGS. 4A and 4B.

The acquiring section 121 downloads the web page information from the server 2 through the communication device 13. As illustrated in FIG. 4B, a web page WP includes a first object BJ1 exhibiting an image and a second object BJ2 exhibiting a link on the web page WP. In the embodiments of the present disclosure, a case in which the web page WP exhibits news, for example, is described. The acquiring section 121 first downloads information other than that of the first object BJ1 from the server 2. Thereafter, the acquiring section 121 downloads image information corresponding to the first object BJ1 from the server 2.

The first display section 122 displays an alternative web page WPA on the display 111 as illustrated in FIG. 4A, before image information is downloaded by the acquiring section 121. In the alternative web page WPA, the first object BJ1 of the web page WP has been replaced with a third object BJ3 that indicates that an image is to be displayed. The image information is equivalent to "information indicating the image". The image corresponds to the first object BJ1. Also, the image may be a moving image according to the embodiments of the present disclosure.

The second display section 123 displays the web page WP on the display 111 after the image information is downloaded by the acquiring section 121. Specifically, the second display section 123 displays the first object BJ1 and the second object BJ2 such that a display location of the second object BJ2 displayed by the second display section 123 coincides with a display location of the second object BJ2 displayed by the first display section 122.

As described above with reference to FIGS. 1 to 4B, in the embodiments of the present disclosure, the first display section 122 displays the alternative web page WPA before the information indicating the image is downloaded, and the second display section 123 displays the web page WP after the information indicating the image is downloaded. Also, the second display section 123 displays the first object BJ1 and the second object BJ2 such that the display location of the second object BJ2 on the web page WP coincides with the display location of the second object BJ2 on the alternative web page WPA. Therefore, the display location of the second object BJ2 exhibiting the link on the web page WP does not change before or after the information indicating the image is downloaded. Accordingly, operability for the user can increase.

First Embodiment

Next, a process of the controller 12 according to the first embodiment will be described with reference to FIGS. 1 to 5.

As illustrated in FIG. 4A, the alternative web page WPA is displayed on the display 111. The alternative web page WPA includes the second object BJ2, the third object BJ3, a fourth object BJ4, and a sixth object BJ6. A first direction DR1 indicates a direction along a long side of the display 111 (down direction). A second direction DR2 indicates a direction along a short side of the display 111 (right direction).

The second object BJ2 is located adjacent to forward ends (bottoms) of the third object BJ3 and the fourth object BJ4 in the first direction DR1, on the alternative web page WPA. Also, the second object BJ2 exhibits a link on the web page WP. The link is to a detailed web page in which detailed contents are recorded. The detailed contents are of news stories, for example, recorded on the web page WP. That is, when the user executes a touch operation on a location corresponding to the second object BJ2, the controller 12 downloads the detailed web page and displays the detailed web page on the display 111.

The third object BJ3 is located adjacent to a forward end (bottom) of the sixth object BJ6 in the first direction DR1. Also, the third object BJ3 is located adjacent to a forward end (right side) of the fourth object BJ4 in the second direction DR2. The third object BJ3 indicates that the image of the first object BJ1 is to be displayed. The third object BJ3 is smaller in size than the first object BJ1. For example, left-right dimensions of the third object BJ3 and the first object BJ1 are approximately the same, but a top-bottom dimension of the third object BJ3 is smaller than a top-bottom dimension of the first object BJ1. The third object BJ3, for example, is downloaded from the server 2 by the acquiring section 121 before the acquiring section 121 downloads the first object BJ1.

The fourth object BJ4 is located adjacent to a forward end (bottom) of the sixth object BJ6 in the first direction DR1. The fourth object BJ4 is also located on a back end (left side) of the alternative web page WPA in the second direction DR2. The fourth object BJ4 exhibits text information describing a news summary.

The sixth object BJ6 is located on a back end (top) of the alternative web page WPA in the first direction DR1 and the back end (left side) of the alternative web page WPA in the second direction DR2. The sixth object BJ6 exhibits text information that is a news headline.

As illustrated in FIG. 4B, a first web page WP1 is displayed on the display 111. The first web page WP1 differs from the alternative web page WPA in that a first object BJ1A is displayed instead of the third object BJ3. In the following, the main points of difference between the first web page WP1 and the alternative web page WPA are described. The first web page WP1 is an example of the web page WP.

The first web page WP1 includes the first object BJ1A, the second object BJ2, the fourth object BJ4, and the sixth object BJ6. Also, in FIG. 4B, the size of the first object BJ1 is indicated by an imaginary line.

On the first web page WP1, the first object BJ1A is displayed instead of the first object BJ1 so that the display location of the second object BJ2 coincides with the display location of the second object BJ2 on the alternative web page WPA.

Specifically, instead of the first object BJ1, the second display section 123 displays the first object BJ1A obtained by reducing the first object BJ1 so that the size of the first object BJ1 in the first direction DR1 approximately coincides with the size of the fourth object BJ4 in the first direction DR1.

Figure 5:
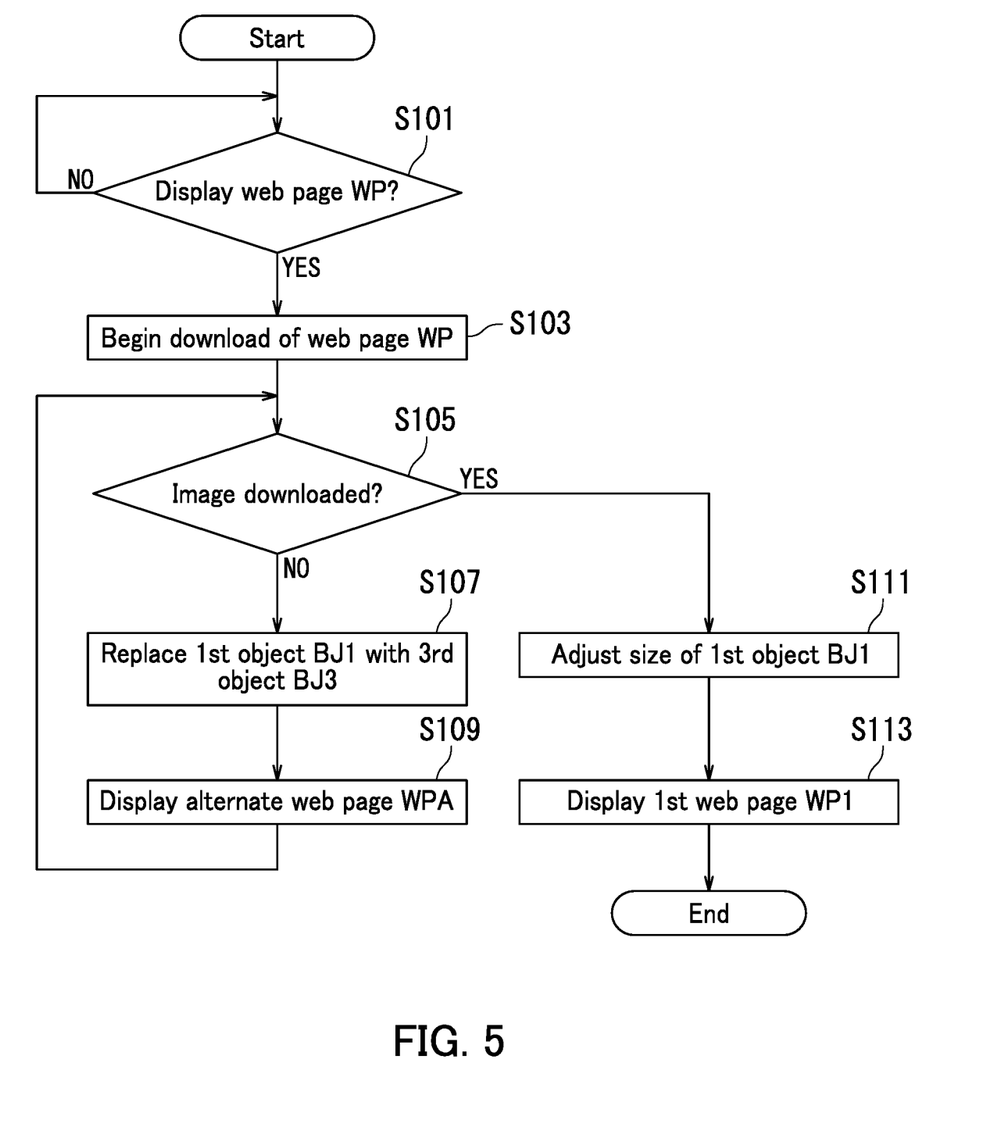
FIG. 5 is a flowchart illustrating the process of the controller according to the first embodiment.

Next, the process of the controller 12 according to the first embodiment will be described with reference to FIGS. 1 to 5. FIG. 5 is a flowchart illustrating the process of the controller 12 in the first embodiment.

As illustrated in FIG. 5, the acquiring section 121 determines whether or not to display the web page WP in Step S101. For example, the acquiring section 121 determines whether or not to display the web page WP based on an operation from the user through the touch panel 11.

When the acquiring section 121 has determined not to display the web page WP (NO in Step S101), the process enters a standby state. When the acquiring section 121 has determined to display the web page WP (YES in Step S101), the process progresses to Step S103.

Then, in Step S103, the acquiring section 121 begins downloading the web page WP from the server 2.

Next, in Step S105, the controller 12 determines whether or not the image information corresponding to the first object BJ1 has been downloaded.

When the controller 12 has determined that the image information was downloaded (YES in Step S105), the process progresses to Step S111. When the controller 12 has determined that the image information was not downloaded (NO in Step S105), the process progresses to Step S107.

Then, in Step S107, the first display section 122 generates the alternative web page WPA.

Next, in Step S109, the first display section 122 displays the alternative web page WPA on the display 111, and the process returns to Step S105.

When YES in Step S105, the second display section 123 adjusts the size of the first object BJ1 to generate the first object BJ1A in Step S111.

Then, in Step S113, the second display section 123 displays the first web page WP1 on the display 111, and the process ends. In the first web page WP1, the first object BJ1 of the web page WP has been substituted with the first object BJ1A.

Step S103 is an example of "acquiring". Step S107 and Step S109 are an example of "primarily displaying". Step S111 and Step S113 are an example of "secondarily displaying".

As described above with reference to FIGS. 1 to 5, in the first embodiment of the present disclosure, the first display section 122 displays the third object BJ3 and the second object BJ2 arranged in the first direction DR1 along the long side of the display 111. The second display section 123 displays the second object BJ2 adjacent to an end of the first object BJ1 in the first direction DR1. Therefore, the second object BJ2 can move in the first direction DR1 when the third object BJ3 is updated to the first object BJ1 that is larger in size than the third object BJ3. However, the second display section 123 displays the first object BJ1 and the second object BJ2 such that the display location of the second object BJ2 on the alternative web page WPA coincides with the display location of the second object BJ2 on the first web page WP1. Therefore, the display location of the second object BJ2 does not change before or after the information indicating the image is downloaded. Therefore, the operability for the user can increase.

The second display section 123 also adjusts the size of the first object BJ1 and displays the first object BJ1 such that the display location of the second object BJ2 displayed by the second display section 123 coincides with the display location of the second object BJ2 displayed by the first display section 122. Therefore, it is possible for the display location of the second object BJ2 from before the information indicating the image is downloaded to coincide with the display location of the second object BJ2 from after the information indicating the image is downloaded. Accordingly, the operability for the user can increase.

Second Embodiment

Figure 6A:
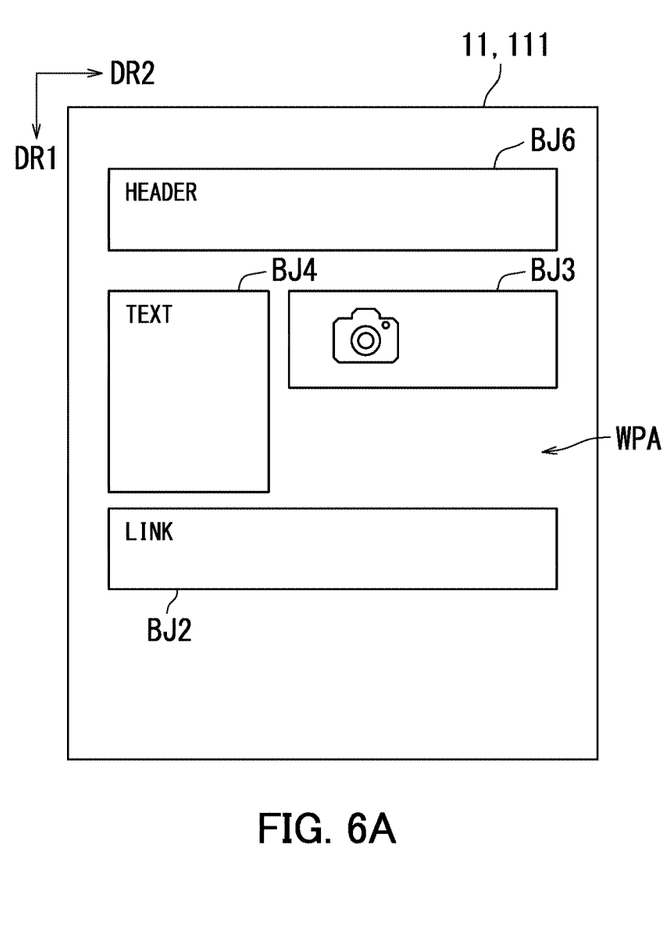
FIG. 6A illustrates a screen from before the image information is downloaded.
Figure 6B:
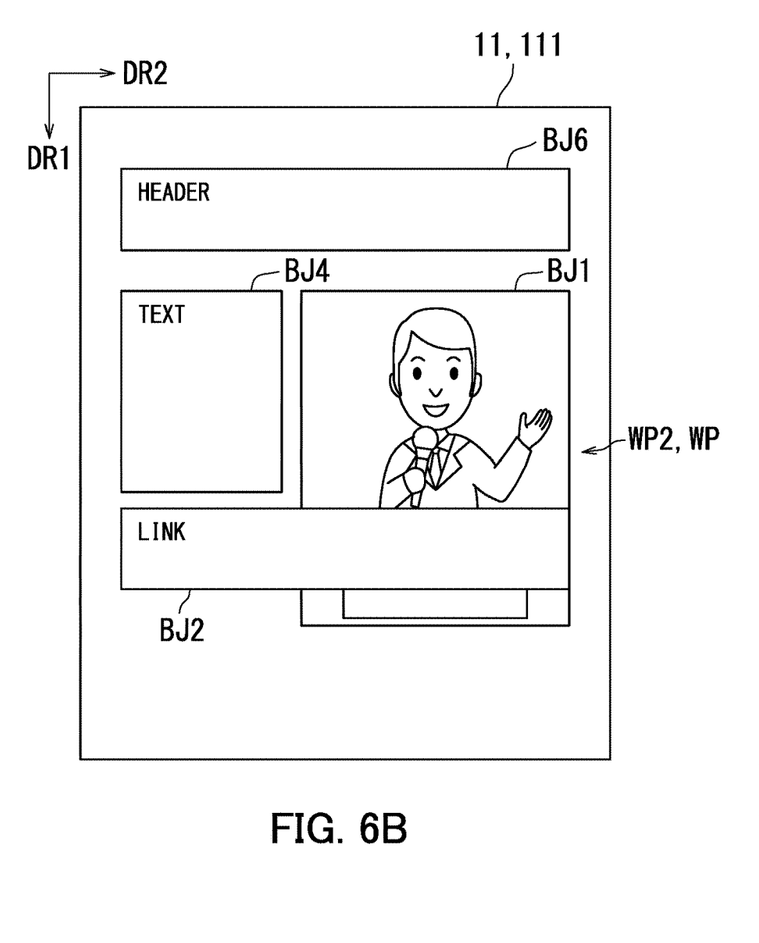
FIG. 6B illustrates a screen from after the image information is downloaded.

Next, a process of the controller 12 according to the second embodiment will be described with reference to FIGS. 1 to 3, 6A, and 6B. FIGS. 6A and 6B are screen diagrams illustrating an example of the process of the controller 12 according to the second embodiment. FIG. 6A illustrates a screen from before the image information is downloaded. FIG. 6B illustrates a screen from after the image information is downloaded.

As illustrated in FIG. 6A, the alternative web page WPA is displayed on the display 111. The alternative web page WPA illustrated in FIG. 6A is the same as the alternative web page WPA illustrated in FIG. 4A, therefore a description thereof will be omitted.

As illustrated in FIG. 6B, a second web page WP2 is displayed on the display 111. The second web page WP2 differs from the alternative web page WPA in that the first object BJ1 is displayed instead of the third object BJ3. In the following, the main points of difference between the second web page WP2 and the alternative web page WPA are described. The second web page WP2 is an example of the web page WP.

The second web page WP2 includes the first object BJ1, the second object BJ2, the fourth object BJ4, and the sixth object BJ6.

The second object BJ2 is displayed such that the display location of the second object BJ2 on the second web page WP2 coincides with the display location of the second object BJ2 on the alternative web page WPA. Also, a portion of the second object BJ2 is overlapping with the first object BJ1. The second object BJ2 is displayed in an area in which the first object BJ1 and the second object BJ2 are overlapping.

The second display section 123 displays the second object BJ2 in the same display location as the second object BJ2 in the alternative web page WPA illustrated in FIG. 6A. The second display section 123 also displays the second object BJ2 over the first object BJ1 when the second object BJ2 overlaps with at least a portion of the first object BJ1. As a result, at least a portion of the first object BJ1 is hidden by the second object BJ2.

Figure 7:
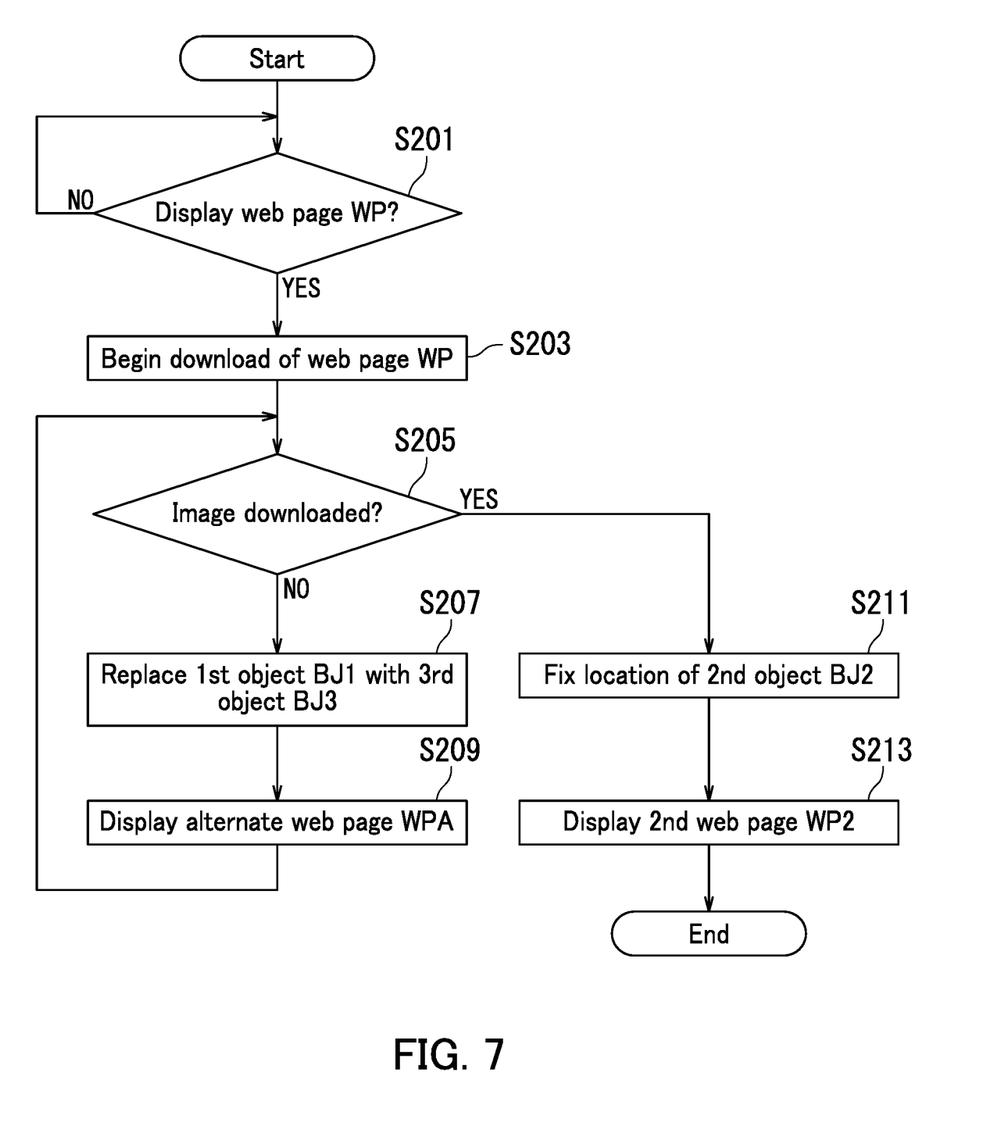
FIG. 7 is a flowchart illustrating the process of the controller according to the second embodiment.

Next, the process of the controller 12 according to the second embodiment will be described with reference to FIGS. 1 to 3 and 5 to 7. FIG. 7 is a flowchart illustrating the process of the controller 12 according to the second embodiment.

Steps S201 to S209 in the flowchart illustrated in FIG. 7 are respectively the same as Steps S101 to S109 in the flowchart illustrated in FIG. 5, therefore a description thereof will be omitted. In the following, the process is described from Step S211.

When the controller 12 has determined that the image information was downloaded (YES in Step S205), in Step S211, the second display section 123 displays the second object BJ2 on the second web page WP2 in the same display location as the second object BJ2 on the alternative web page WPA.

Also, when the second object BJ2 on the second web page WP2 overlaps with at least a portion of the first object BJ1, the second display section 123 displays the second object BJ2 over the first object BJ1.

Next, in Step S213, the second display section 123 displays the second web page WP2 on the display 111, and the process ends.

As described above with reference to FIGS. 1 to 3 and 5 to 7, in the second embodiment of the present disclosure, the second display section 123 displays the second object BJ2 on the second web page WP2 in the same display location as the second object BJ2 on the alternative web page WPA. Therefore, the display location of the second object BJ2 from before the information indicating the image is downloaded can coincide with the display location of the second object BJ2 from after the information indicating the image is downloaded. Accordingly, operability for the user can increase.

Also, the second display section 123 displays the second object BJ2 over the first object BJ1 when the second object BJ2 overlaps with at least a portion of the first object BJ1. Therefore, occurrence of a situation in which the second object BJ2 is hidden by the first object BJ1 can be avoided. Accordingly, visibility of the second object BJ2 can be ensured. As a result, the operability for the user can be further improved.

Third Embodiment

Figure 8:
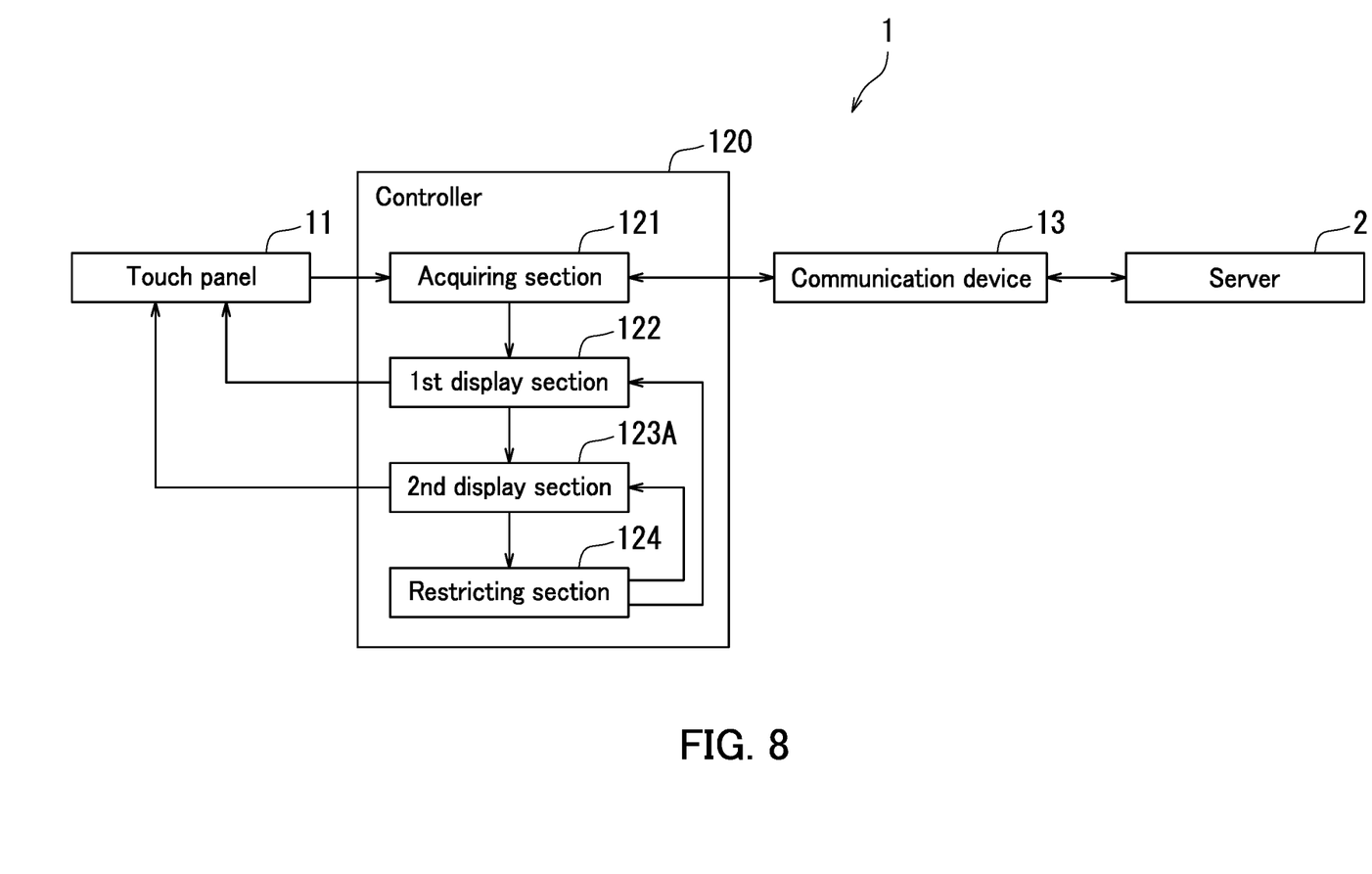
FIG. 8 is a diagram illustrating a configuration of the controller according to a third embodiment of the present disclosure.
Figure 9A:
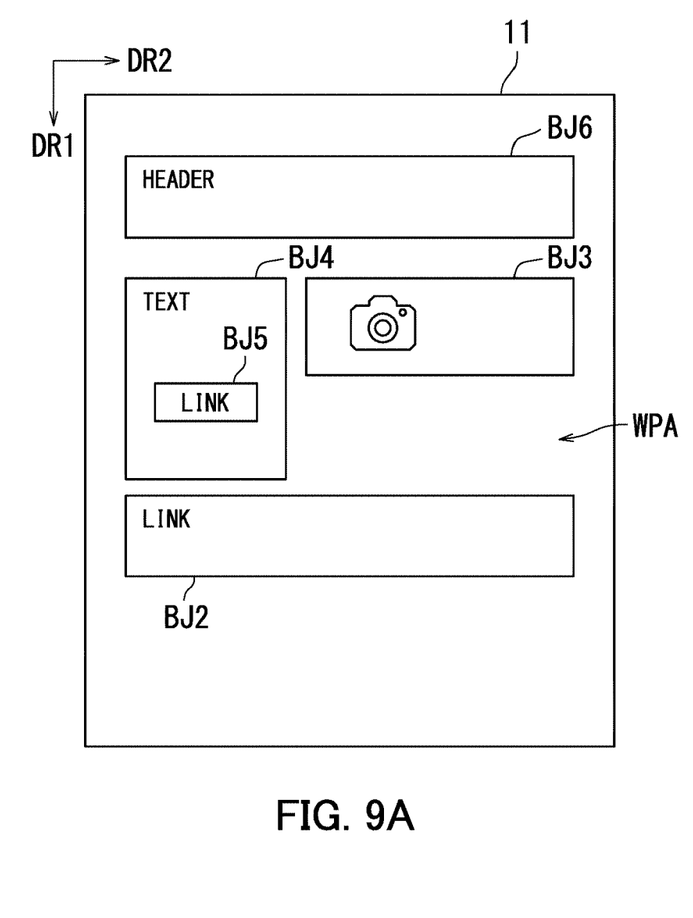
FIG. 9A illustrates a screen from before the image information is downloaded.
Figure 9B:
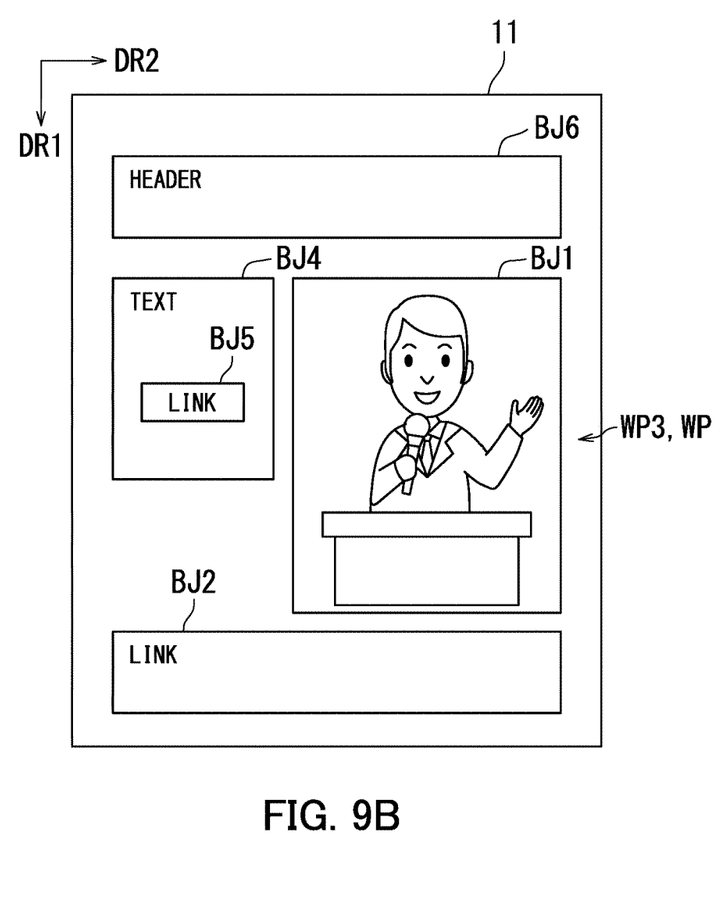
FIG. 9B illustrates a screen from after the image information is downloaded.

Next, the controller 12 according to the third embodiment will be described with reference to FIGS. 1 to 3 and 8 to 10. FIG. 8 is a diagram illustrating a configuration of a controller 120 according to the third embodiment. FIGS. 9A and 9B are screen diagrams illustrating an example of a process of the controller 120 according to the third embodiment. FIG. 9A illustrates a screen from before the image information is downloaded. FIG. 9B illustrates a screen from after the image information is downloaded. The controller 120 includes a restricting section 124, and differs from the controller 12 according to the first and second embodiments illustrated in FIG. 3 by including a second display section 123A instead of the second display section 123. In the following, the main points of difference between the configurations of the controller 120 and the controller 12 are explained.

The second display section 123A displays a third web page WP3 on the display 111 after the image information has been downloaded by the acquiring section 121. The third web page WP3 is an example of the web page WP.

When the touch operation is executed on the first object BJ1 of the third web page WP3, the restricting section 124 restricts the linked detailed web page from the link of the first object BJ1 from being displayed until a first condition is fulfilled. For example, the restricting section 124 restricts a function of the link of the first object BJ1. Specifically, the restricting section 124 puts the link of the first object BJ1 in an inactive state. The touch operation is an example of a "predetermined operation".

The "first condition" is passage of a predetermined amount of time from a moment when the second display section 123A displays the third web page WP3, for example. The predetermined amount of time is ten seconds, for example. The first condition may also be execution of a specific operation by the user. The specific operation is a scroll operation, for example.

Also, the third web page WP3 includes the fourth object BJ4 as illustrated in FIG. 9B. The fourth object BJ4 exhibits text information describing a news summary. The fourth object BJ4 includes a fifth object BJ5. The fifth object BJ5 exhibits a link on the third web page WP3.

When an operation (a touch operation, for example) for displaying a linked web page from the link is executed on the fifth object BJ5 of the third web page WP3, the restricting section 124 restricts the linked web page from the link of the fifth object BJ5 from being displayed until a second condition is fulfilled. For example, the restricting section 124 restricts a function of the link of the fifth object BJ5. Specifically, the restricting section 124 puts the link of the fifth object BJ5 in an inactive state.

The second condition is the same as the first condition, for example.

Next, the process of the controller 120 will be described with reference to FIGS. 1 to 5 and 8 to 10. The screen illustrated in FIG. 9A differs from the screen illustrated in FIG. 4A in that the fourth object BJ4 includes the fifth object BJ5.

As illustrated in FIG. 9B, the third web page WP3 is displayed on the display 111. The third web page WP3 differs from the alternative web page WPA in that the first object BJ1 is displayed instead of the third object BJ3. The third web page WP3 also differs from the alternative web page WPA in that the function of the link of the fifth object BJ5 is restricted. Additionally, the link of the first object BJ1 is restricted in the third web page WP3.

Figure 10:
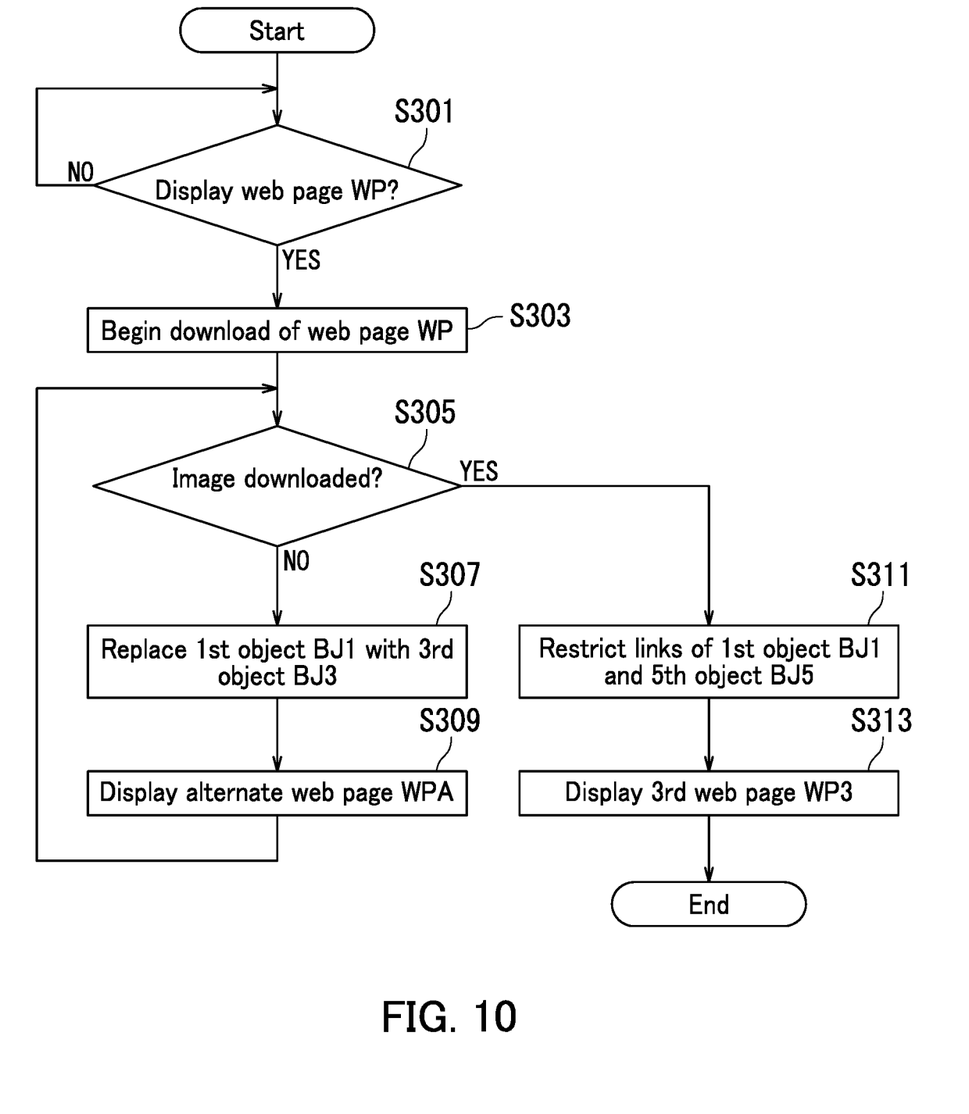
FIG. 10 is a flowchart illustrating the process of the controller according to the third embodiment.

FIG. 10 is a flowchart illustrating the process of the controller 120 according to the third embodiment. Steps S301 to S309 in the flowchart illustrated in FIG. 10 are respectively the same as Steps S101 to S109 in the flowchart illustrated in FIG. 5, therefore a description thereof will be omitted. In the following, the process is described from Step S311.

When the controller 120 has determined that the image information was downloaded (YES in Step S305), in Step S311, the restricting section 124 restricts the functions of the links of the first object BJ1 and the fifth object BJ5.

Next, in Step S313, the second display section 123A displays the third web page WP3 on the display 111, and the process ends.

Step S303 is an example of the "acquiring". Steps S307 and S309 are an example of the "primarily displaying". Step S311 is an example of "restricting". Step S313 is an example of the "secondarily displaying".

As described above with reference to FIGS. 1 to 5 and 8 to 10, in the third embodiment of the present disclosure, the first object BJ1 is configured to display the linked web page from the link of the first object BJ1 when the touch operation is executed on the first object BJ1. When the touch operation is executed on the first object BJ1, the restricting section 124 restricts the linked web page from the link of the first object BJ1 from being displayed until the first condition is fulfilled. Therefore, the linked web page from the link of the first object BJ1 is not displayed even when the touch operation is executed on the first object BJ1 by mistake. Accordingly, the operability for the user is increased.

Also, the restricting section 124 restricts the linked web page from the link of the fifth object BJ5 from being displayed until the second condition is fulfilled, even when the operation (touch operation) for displaying the linked web page from the link is executed on the fifth object BJ5. Therefore, the linked web page from the link of the fifth object BJ5 is not displayed even when the touch operation is executed on the fifth object BJ5 by mistake. Accordingly, the operability for the user can increase.

The embodiments of the present disclosure are described above with reference to the drawings. However, the present disclosure is not limited to the above embodiments, and may be implemented in various manners within a scope not departing from the gist thereof (for example, (1) to (7) described below). The drawings are schematic illustrations that emphasize elements of a configuration in order to facilitate understanding thereof. Properties of elements of configuration illustrated in the drawings, such as thicknesses, lengths, and numbers thereof, may differ from actual properties thereof in order to facilitate preparation of the drawings. Also, properties of elements of configuration described in the above embodiments, such as shapes and dimensions, are merely examples, not intended as specific limitations, and may be variously altered within a scope not substantially departing from the configuration of the present disclosure.

(1) As described with reference to FIG. 1, in the embodiments of the present disclosure, the "display control apparatus" is the smartphone 1, but the present disclosure is not limited hereto. The display control apparatus need only include the display 111, the controller 12, and the communication device 13. For example, the display control apparatus may also be a personal computer. Specifically, the display control apparatus may also be a tablet-type personal computer.

(2) As described with reference to FIGS. 1 to 10, in the embodiments of the present disclosure, the web page WP displays news, but the present disclosure is not limited hereto. The web page WP need only include the first object exhibiting an image and the second object exhibiting a link of the web page WP. For example, the web page WP may be part of a home page for an organization such as a company, or an individual.

(3) As described with reference to FIGS. 1 to 10, in the embodiments of the present disclosure, the first object BJ1 exhibits an image, but the present disclosure is not limited hereto. The first object need only exhibit at least one of an image and a moving image. For example, the first object may exhibit both an image and a moving image.

(4) As described in FIGS. 1 to 10, in the embodiments of the present disclosure, the link of the second object BJ2 is to a detailed web page, but the present disclosure is not limited hereto. The second object need only exhibit a link. For example, the link of the second object BJ2 may be to a web page in which information is recorded that is related to the information recorded in the web page WP.

(5) As described with reference to FIGS. 1 to 10, in the embodiments of the present disclosure, the acquiring section 121 downloads the third object BJ3 from the server 2, but the present disclosure is not limited hereto. The third object BJ3 need only indicate that an image is to be displayed. For example, the third object BJ3 may be an object that is stored in the smartphone 1.

(6) As described with reference to FIGS. 1 to 10, in the embodiments of the present disclosure, the "predetermined operation" is a touch operation, but the present disclosure is not limited hereto. The predetermined operation need only be an operation for displaying a linked web page from a link. For example, the predetermined operation may be a double tap operation. For another example, the predetermined operation may be a swipe operation. For another example, the predetermined operation may be a left-click operation on a mouse.

(7) As described with reference to FIGS. 1 to 5 and 8 to 10, in the third embodiment of the present disclosure, the restricting section 124 restricts the linked web pages from the links of the first object BJ1 and the fifth object BJ5 from being displayed, but the present disclosure is not limited hereto. The restricting section need only restrict the linked web page from the link of the first object BJ1 from being displayed. For example, the restricting section may restrict only the linked web page from the link of the first object BJ1 from being displayed. Also, for example, the restricting section may restrict the linked web pages from the links of all of the objects included in the web page WP from being displayed.

What is claimed is:

1. A display control apparatus for displaying a web page including a first object and a second object, the first object exhibiting an image, the second object exhibiting a link on the web page, the display control apparatus comprising:
a display;
an acquiring section configured to download information indicating the web page from a server;

a first display section configured to display an alternative web page on the display before information indicating the image is downloaded; and a second display section configured to display the web page on the display after the information indicating the image is downloaded, wherein the alternative web page is identical to the web page aside from including a third object instead of the first object, the third object indicating that the image is to be displayed, the second display section displays the first object and the second object such that a display location of the second object on the web page coincides with a display location of the second object on the alternative web page, a linked web page from a link of the first object being displayed when a predetermined operation is executed on the first object, the display control apparatus further comprises a restricting section configured to restrict the linked web page from being displayed until a first condition is fulfilled, when the predetermined operation is executed on the first object, the web page further includes a fourth object exhibiting text, the fourth object includes at least one fifth object exhibiting a link on the web page, the restricting section restricts a linked web page from the link of the fifth object from being displayed until a second condition is fulfilled, when an operation for displaying the linked web page from the link of the fifth object is executed on the fifth object, and the second condition is passage of a predetermined amount of time from a moment when the second display section displays the web page on the display.

2. The display control apparatus according to claim 1, wherein
the first display section displays the third object and the second object arranged in a first direction along a long side of the display, and
the second display section displays the second object adjacent to an end of the first object in the first direction.

3. The display control apparatus according to claim 2, wherein
the second display section adjusts a size of the first object and displays the first object such that the display location of the second object on the web page coincides with the display location of the second object on the alternative web page.

4. The display control apparatus according to claim 1, wherein
the second display section displays the second object in the same display location as the second object on the alternative web page.

5. The display control apparatus according to claim 4, wherein
when the second object overlaps with at least a portion of the first object, the second display section displays the second object over the first object.

6. The display control apparatus according to claim 1, wherein
the first condition is passage of a predetermined amount of time from a moment when the second display section displays the web page on the display.

7. The display control apparatus according to claim 1, wherein
the restricting section restricts a function of the link of the first object.

8. The display control apparatus according to claim 1, wherein the restricting section restricts a function of the link of the fifth object.

9. A display control method for implementation by a display control apparatus for displaying a web page on a display, the web page including a first object and a second object, the first object exhibiting an image, the second object exhibiting a link on the web page, the display control method comprising:

acquiring in which information indicating the web page is downloaded from a server;

primarily displaying an alternative web page on the display before information indicating the image is downloaded; and secondarily displaying the web page on the display after the information indicating the image is downloaded, wherein the alternative web page is identical to the web page aside from including a third object instead of the first object, the third object indicating that the image is to be displayed, in the secondarily displaying, the first object and the second object are displayed such that a display location of the second object on the web page coincides with a display location of the second object on the alternative web page, a linked web page from a link of the first object being displayed when a predetermined operation is executed on the first object, and the linked web page from the link of the first object is restricted from being displayed until a first condition is fulfilled, when the predetermined operation is executed on the first object, the web page further includes a fourth object exhibiting text, the fourth object includes at least one fifth object exhibiting a link on the web page, the restricting section restricts a linked web page from the link of the fifth object from being displayed until a second condition is fulfilled, when an operation for displaying the linked web page from the link of the fifth object is executed on the fifth object, and the second condition is passage of a predetermined amount of time from a moment when the second display section displays the web page on the display.

* * * * *